US005568655A

United States Patent [19]

Heinonen et al.

[11] Patent Number: 5,568,655

[45] Date of Patent: Oct. 22, 1996

[54] DETECTION OF PAGER SIGNAL IN FM RADIO TRANSMISSION

[75] Inventors: Jouko Heinonen, Salo; Henrik Sunell, Marttila; Matti Koskinen, Perniö, all of Finland

[73] Assignee: Nokia Mobile Phones Ltd., Salo, Finland

[21] Appl. No.: 338,034

[22] Filed: Nov. 14, 1994

[30] Foreign Application Priority Data

Nov. 13, 1993 [GB] United Kingdom .................... 9323461

[51] Int. Cl.$^{6}$ .................... H04B 1/00

[52] U.S. Cl. .................... 455/38.1; 455/45; 455/214

[58] Field of Search .................... 455/45, 180.3, 455/161.1, 214, 227, 229, 260, 38.1, 38.2

[56] References Cited

U.S. PATENT DOCUMENTS 4,476,581 10/1984 Bragas .................... 455/45
5,146,612 9/1992 Grosjean et al. .................... 455/45
5,170,487 12/1992 Peek .................... 455/45
5,428,610 6/1995 Davis .................... 455/45

FOREIGN PATENT DOCUMENTS 8503824 8/1985 WIPO .................... 455/45

*Primary Examiner*—Andrew Faile
*Attorney, Agent, or Firm*—Perman & Green

[57] ABSTRACT

Apparatus for detecting the presence of a paging signal at 57 KHz in a frequency modulated transmission includes a phase locked loop (14) which is sensitive to the presence of a pager signal. The phase locked loop (14) which produces phase adjusting pulses at a repetition rate representative of the presence or absence of a pager signal. The phase adjusting pulses are fed to a detector (22) which produces a bistable signal which is either low, indicating no pager signal, or high, indicating the presence of a pager signal.

6 Claims, 3 Drawing Sheets

DETECTION OF PAGER SIGNAL IN FM RADIO TRANSMISSION

BACKGROUND OF THE INVENTION

Field of the Invention

This invention relates to apparatus for detecting the presence of a pager signal in a frequency modulated (FM) radio transmission.

The FM radio frequency band typically extends from about 87 to 104 MHz. Within this band there are a plurality of channels, each carrying a stereo multipleted signal or mono signal, to which is sometimes added a pager signal transmitted on a sub-carrier at a predetermined frequency. Typically, this predetermined frequency is 57 KHz, being phase locked to the third harmonic of the 19 pilot tone of the stereophonic multiplex signal.

When a receiver is scanning the channels for a paging signal, it detects the audio signal (music, speech etc.) and then checks for the existence of a pager signal at 57 KHz. The receiver thus scans through every channel transmitting an audio signal and checks for the existence of a page signal. This takes a substantial time because a pager signal is not transmitted on all channels. The invention aints to provide apparatus which speeds up the location of pager signals in a frequency modulated radio transmission.

SUMMARY OF THE INVENTION

According to the invention there is provided apparatus for detecting the presence of a pager signal at a predetermined frequency in a frequency modulated transmission, comprising circuitry tuned to the predetermined frequency so as to he sensitive to the presence of the pager signal, and detector means responsive to the circuitry for detecting the presence of the pager signal.

Preferably, the circuitry comprises a phase locked loop operative to produce an output signal consisting of a stream of pulses at a pulse repetition frequency representative of the presence or absence of the pager signal, the output signal being fed to the detector.

In a preferred embodiment the detector is operative to detect the number of pulses produced in a predetermined time. The detector may comprise a comparator and a counter, the counter counting the number of pulses produced in a predetermined time and the comparator comparing the counted pulses with n predetermined threshold count held in a threshold register.

BRIEF DESCRIPTION OF THE DRAWINGS

The invention will now be further described, by way of example, with reference to the accompanying drawings, in which.

DESCRIPTION OF THE PREFERRED EMBODIMENTS

Figure 1:
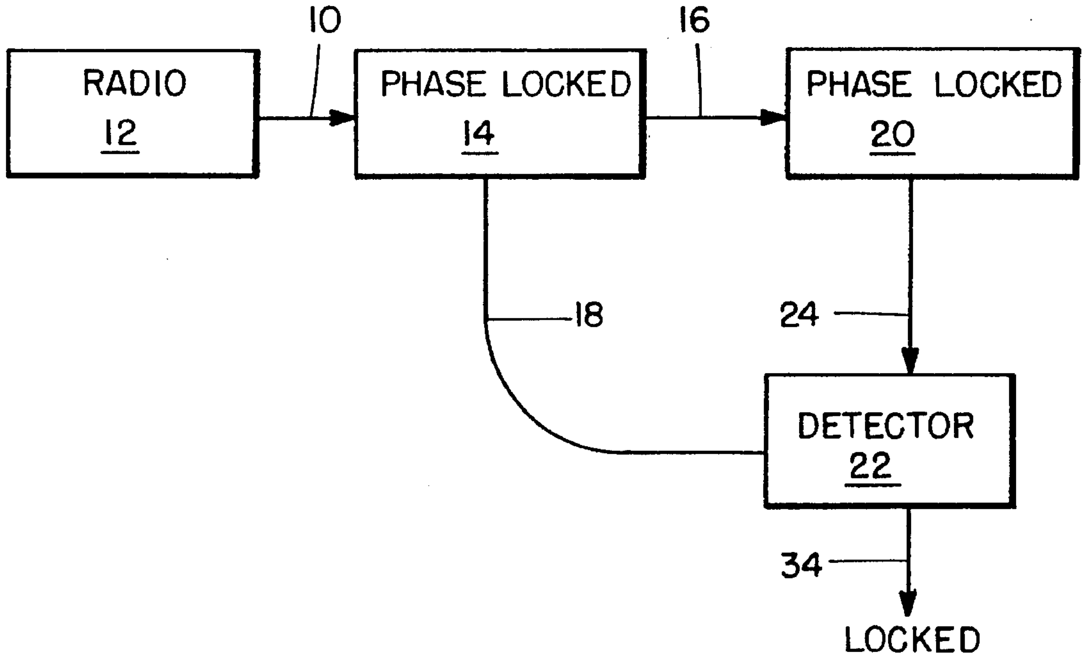
FIG. 1 is a block circuit diagram of apparatus according to the invention.

Referring to FIG. 1, an audio signal 10 from a radio 12 is fed to a 57 KHz phase locked loop 14. The phase locked loop is tuned to signals at 57 KHz. It produces a first output 16 consisting of pager data (ie the message transmitted in the pager signal) and a second output 18 consisting of a sequence of pulses at a pulse repetition frequency indicative of the presence or absence of a pager signal a 57 KHz. The first output 16 is fed to a pager data phase locked letup 20. A locking detector 22 receives the signal on output 18 and a count 24 from a clock operating at a frequency of 1187.5 KHz.

Figure 2:
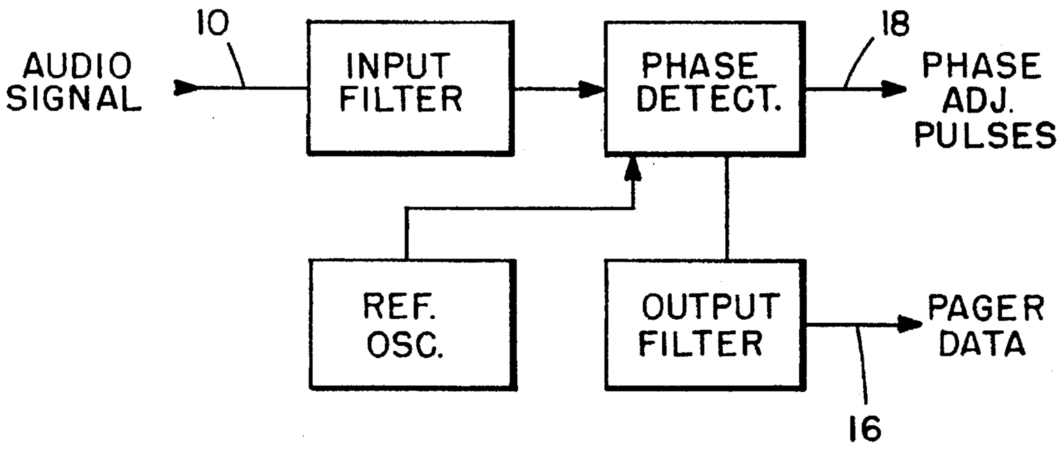
FIG. 2 is a block circuit diagram of a 57 KHz phase locked loop of the apparatus of FIG. 1.
Figure 3:
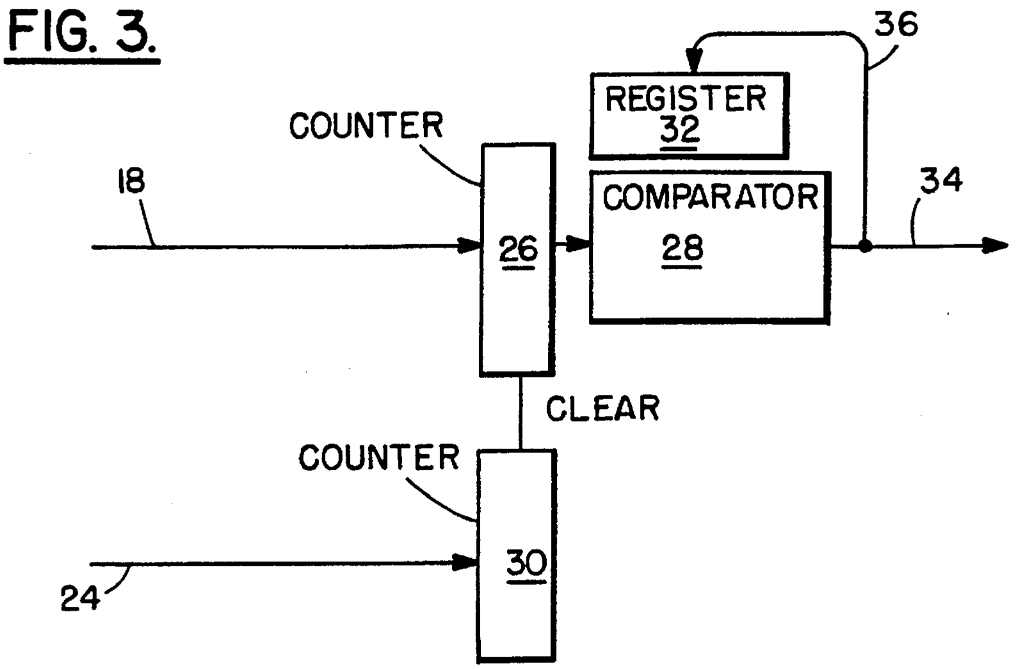
FIG. 3 is a block circuit diagram of a locking detector of the apparatus of FIG. 1.

FIG. 2 shows diagrammatically the components of The phase locked loop 14 and FIG. 3 shows diagrammatically the components of the locking detector 22.

Referring to FIG. 3, the pulses on output 18 are fed to a counter 26 which feeds a comparator 28. The clock signal 24, fed through a counter 30, acts to reset the counter 26 at time intervals corresponding to two periods of the 1187.5 KHz clock, i.e. approximately every 2.5 milliseconds. The count accumulated in the counter 26 during each time interval of two periods of the clock is compared in the comparator 28 with a predetermined threshold count held in a threshold register 32. If the pulse count exceeds the predetermined threshold level, this indicates the absence of a pager signal at 57 KHz and the output 34 of the locking detector remains at a "low" level. If the count accumulated in the counter 26 during the two periods of the system clock falls below the threshold value, this indicates the presence of a 57 KHz pager signal and the output 34 of the locking riorector goes to a "high" level. Hence, the output 34 is essentially a bistable signal, being low when no pager signal is detected and being high when a pager signal is detected.

Figure 5:
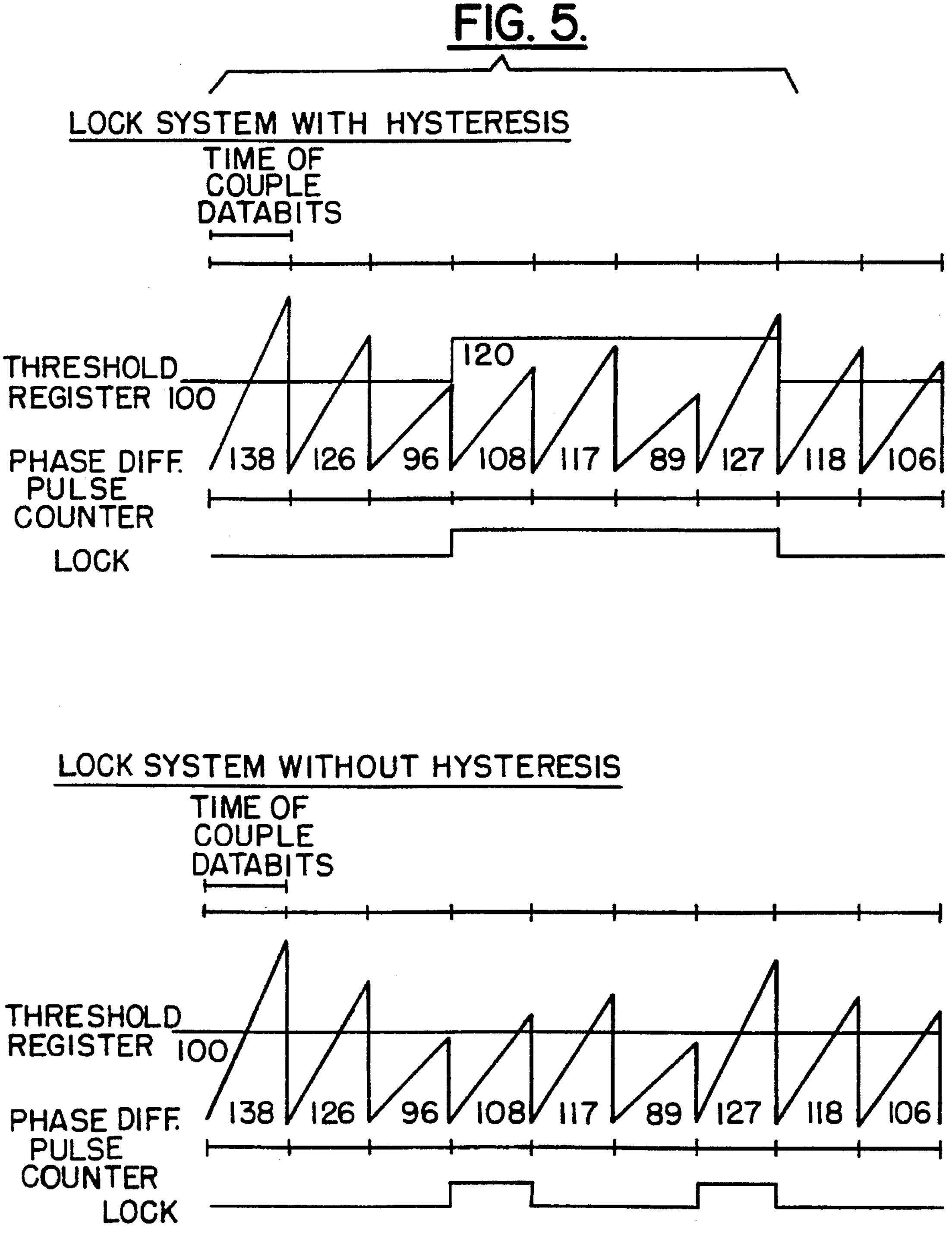
FIG. 5 consists of two diagrams showing how the hysteresis or feedback employed in the detector stabilizes its operation.

To stabilize the output 34 a feedback loop providing hysteresis is employed, the output 34 being fed back via a feedback loop 36 to the threshold register 32. FIG. 5 illustrates in its lower diagram how the locking detector would work without hysteresis and, for the purposes of comparison, shows in its upper part how the detector works with hysteresis. In FIG. 5, the threshold count is shown as 100 and the sawtooth wave represents the count accumulated in the counter 26. Comparison of the two pails of FIG. 5 shows how the output 34 is stabilized as a result of the hysteresis employed in the system. With hysteresis, the clock count has to go higher in order to reset the locking signal to the low level.

Figure 4:
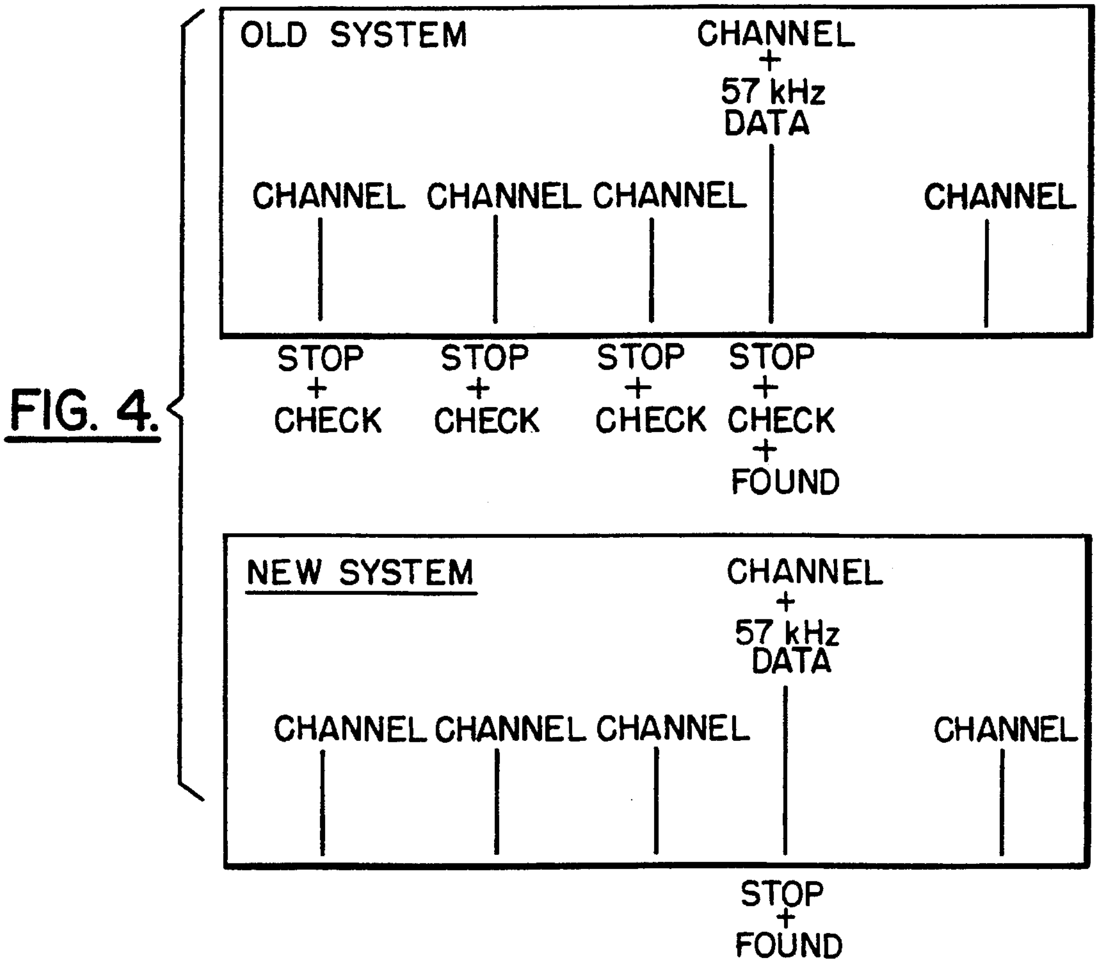
FIG. 4 is a diagram comparing the operation of the inventive apparatus with conventional apparatus.

FIG. 4 is a comparison of a conventional paging leveler (identified as "Old System") with a paging receiver (identified as "New System") incorporating apparatus according to the invention. FIG. 4 illustrates how the inventive apparatus detects a channel with a pager signal at 57 KHz more rapidly than the typical conventional apparatus.

Apparatus according to tile invention may be incorporated in paging receivers for use in radio data systems operating according to MBS system, or other operational system.

We claim:

1. Apparatus for detecting the presence of a pager signal at a predetermined in a frequency modulated transmission, comprising a phase locked loop circuit tuned to the predetermined frequency and operative to produce an output signal consisting of a stream of pulses at a pulse repetition frequency representative of the presence or absence of the pager signal, and detector means response to the output signal of said phase locked loop circuit for detecting the presence of the pager signal wherein the detector means is operative to detect the number of pulses produced in a predetermined time.

2. Apparatus according to claim 1, wherein the detector means comprises a comparator and a counter, the counter counting the number of pulses produced to the predetermined time and the comparator comparing the counted pulses with a predetermined threshold count held in a threshold register.

3. Apparatus according to claim 2, wherein the output of the comparator is fed back to the threshold register, in order to provide feedback with hysteresis, so as to stabilize the comparator output.

4. Apparatus according to claim 2, wherein the detector means output is bistable, occupying a first state if a pager signal is detected at the predetermined frequency and a second state if a pager signal is not detected at the predetermined frequency.

5. Apparatus according to claim 2, wherein the predetermined time corresponds to two periods of a system clock.

6. Apparatus according to claim 1, wherein the predetermined frequency is 57 KHz.

* * * * *